United States Patent [19]

Nagai

[11] Patent Number: 4,838,375
[45] Date of Patent: Jun. 13, 1989

[54] STEERING SYSTEM

[75] Inventor: Takao Nagai, Yokohama, Japan

[73] Assignee: Kabushiki Kaisha Komatsu Seisakusho, Tokyo, Japan

[21] Appl. No.: 144,921

[22] PCT Filed: Apr. 30, 1987

[86] PCT No.: PCT/JP87/00273

§ 371 Date: Jan. 29, 1988

§ 102(e) Date: Jan. 29, 1988

[87] PCT Pub. No.: WO87/06553

PCT Pub. Date: Nov. 5, 1987

[30] Foreign Application Priority Data

Apr. 30, 1986 [JP] Japan .................. 61-098062
Apr. 30, 1986 [JP] Japan .................. 61-098063

[51] Int. Cl.[4] .................................... B62D 5/08
[52] U.S. Cl. ........................... 180/142; 91/434
[58] Field of Search ........... 180/142, 143, 141, 132; 91/434

[56] References Cited

U.S. PATENT DOCUMENTS 3,834,278  9/1974  Goff et al. .............. 180/132 X

FOREIGN PATENT DOCUMENTS 49-89203   8/1974  Japan .
52-97525   8/1977  Japan .
53-86730   7/1978  Japan .
54-5569    3/1979  Japan .
59-167066 11/1984  Japan .

*Primary Examiner*—John A. Pekar
*Attorney, Agent, or Firm*—Ronald P. Kananen

[57] ABSTRACT

This invention provides a steering system of a fully hydraulically operated type for use in particular in construction vehicles and industrial vehicles and so forth with enhanced stability in operating a steering wheel when the vehicle is running at high speeds without impairing the operability of the steering wheel when the vehicle is running at low speeds. This steering system is provided with an apparatus for regulating the actuating force applied by an actuating shaft connected with a steering wheel by the action of the fluid pressure force to be controlled in accordance with the running speed of the vehicle. Thus, the steering force obtained by the steering gear of the present invention is increased in proportion to the increase in the vehicle speed.

4 Claims, 2 Drawing Sheets

STEERING SYSTEM

TECHNICAL FIELD OF THE INVENTION

This invention relates to a steering system, and more particularly to a steering system of the fully-hydraulically-operated type for use in construction, vehicles, industrial vehicles and the like.

BACKGROUND TECHNIQUE OF THE INVENTION

As for the conventional gear of the kind specified, there has so far been known one which is shown, for example, in Japanese Patent Application Laid-open Specification No. 49-89203.

This conventional steering system has been constructed such that a valve spool is axially moved by the rotation of the steering wheel and the fluid under pressure is supplied, at a flow rate corresponding to the amount of movement of the valve spool, from a gyratory rotor into a steering cylinder through a port whose area of opening is controlled by the movement of the above-mentioned valve spool so that a steering operation corresponding to the angle of rotation of the above-mentioned steering wheel may be made by the action of the fluid pressure force.

In the above-mentioned conventional steering system, since an operating force which is approximately proportional to the amount of movement of the valve spool occurs in the steering wheel, when the fluid pressure is increased for operating the steering wheel while the vehicle is stopped or when quick steering is made by turning the wheel quickly, a large steering force is required. Therefore it has been required to improve the operating performance of the steering wheel.

In the meantime, when a reaction force device such as a torsion bar or a leaf spring, is set lightly to improve the above-mentioned disadvantage, disadvantageous phenomena occur. For example, the reaction or response transmitted through the steering wheel when the vehicle is running straight cannot be sensed by the driver thus giving him a sense of unease moreover, the stability of the vehicle when running at high speeds becomes lower.

SUMMARY OF THE INVENTION

The present invention has been made in view of the above-mentioned situation in the conventional steering system, and has for its object to provide a steering system which provides an improved stability in manipulating the steering wheel when the vehicle is running at high speeds without impairing the operability of the steering wheel when the vehicle is running at low speeds.

To achieve the above-mentioned object, according to the present invention, there is provided a steering system of a fully-hydraulically-operated type constructed such that the fluid under pressure is supplied, at a flow rate corresponding to the amount of rotational movement of an actuating shaft adapted to be rotatively driven by the turning operation of the steering wheel, through a port whose area of opening is controlled by the amount of rotational movement of the actuating shaft, and then through a fluid measuring unit into a steering cylinder so that a steering operation corresponding to the amount of rotation of the steering wheel is made by the action of the fluid pressure force and the amount of pressurized fluid supplied into the steering cylinder, characterized in that the invention comprises an apparatus for regulating the actuating force applied by the actuating shaft by the action of the fluid pressure force to be controlled in accordance with the running speed of the vehicle.

Further, according to the present invention, there is provided a steering system, characterized in that the apparatus for regulating the actuating force applied by the actuating shaft includes a valve spool slidably inserted in the valve bore formed in a valve housing so that it may be axially moved in accordance with the amount of rotational movement of the actuating shaft; a piston portion projecting as an integral unit of a part of the outer periphery of the valve spool and along the outer periphery and which is kept in sliding contact with the inner peripheral surface of the valve housing formed or machined in a part of the inner periphery of the valve bore and along the inner periphery; two annular pressure chambers formed axially on both sides of the piston portion; and a pressure control means interposed between the pressure chambers and a pressurized fluid supply source and adapted to control the fluid pressure forces within both the pressure chambers in accordance with the running speed of the vehicle.

Still further, according to the present invention, there is provided a steering system, characterized in that the apparatus for regulating the actuating force applied by the actuating shaft includes a valve spool slidably inserted in the valve bore formed in the valve housing so that the spool may be axially moved in accordance with the amount of rotational movement of the actuating shaft; a flange projecting integrally from a part of the outer periphery of said actuating shaft and along the outer periphery; an annular piston disposed so as to be moved axially and in such a relationship that the piston is kept in sliding contact with both the outer peripheral surface of the flange and the inner peripheral surface of the annular cylinder recessed in the valve housing, respectively, between the outer peripheral surface and the inner peripheral surface and also abutting against one side surface of the flange; a pressure chamber connected with a pressurized fluid supply source so as to bias the piston towards the flange; and a pressure control means interposed between the pressure chamber and the pressurized fluid supply source and adapted to control the fluid pressure force within the pressure chamber in accordance with the running speed of the vehicle.

Thus, according to the steering system of the present invention, when the fluid pressure is increased for operating the steering wheel while the vehicle is stopped or when quick steering is made by turning the wheel quickly, the steering wheel can be operated by the driver with a comparatively small force in the same manner as the conventional steering systems which have been used in recent years, where the higher the running speed of the vehicle, the more the handle operating force required.

The above-mentioned and other advantages, aspects and objects of the present invention will be apparent to those skilled in the art from the following description and the explanation of the accompanying drawings in which preferred embodiments incorporating the principles of the present invention are shown as examples thereof.

BEST MODE FOR EXEMPLIFYING THE INVENTION

Figure 1:
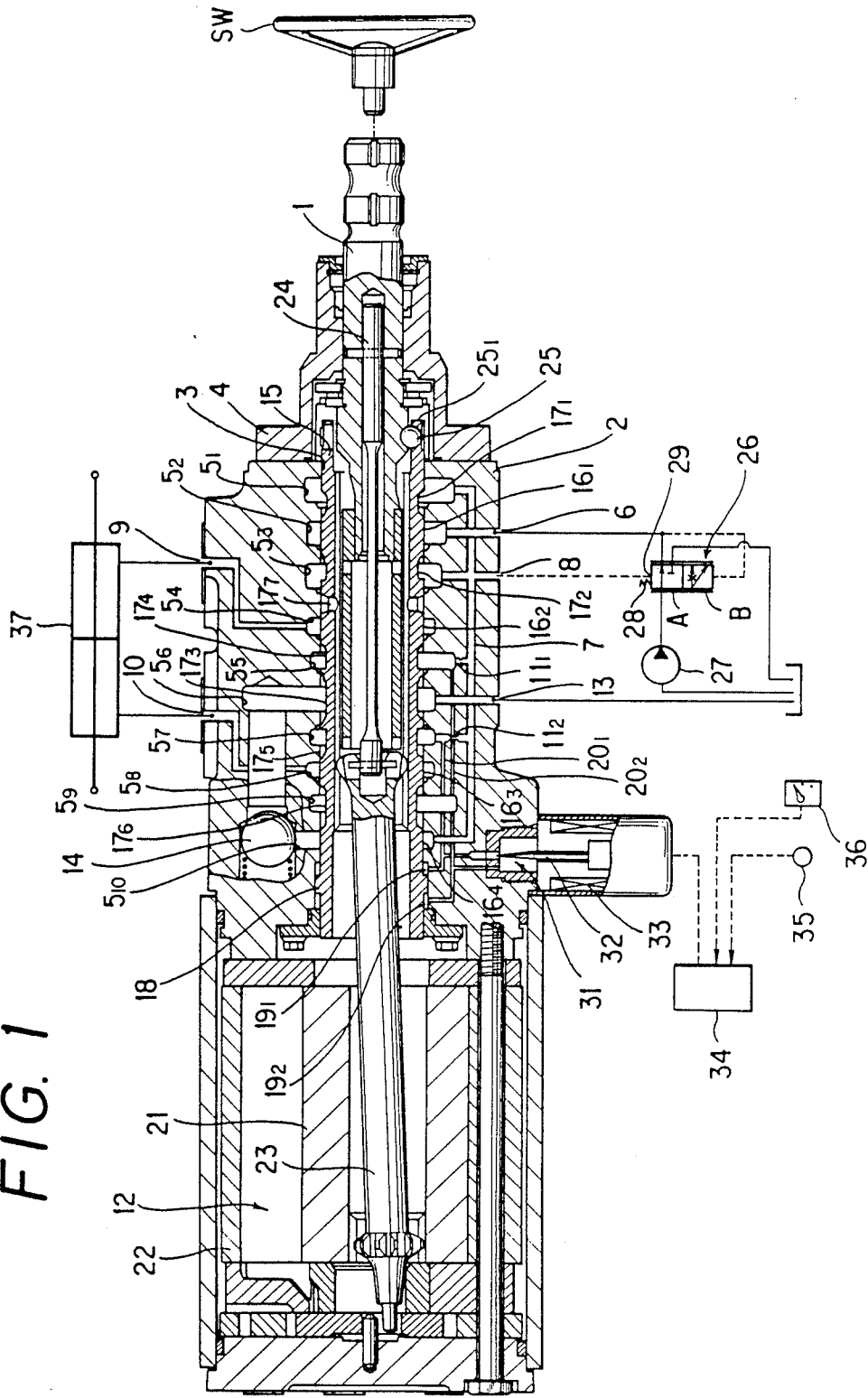
FIG. 1 is a schematic, partially sectioned explanatory view showing one embodiment of a steering system according to the present invention.

The first embodiment of the present invention will now be described below with reference to FIG. 1.

An actuating shaft 1 is rotatably journalled in a valve housing 2. A steering wheel SW is connected directly or by way of an extension shaft and so forth with the end portion of the shaft 1 projecting from the valve housing 2. The valve housing 2 has a cylindrical valve bore 3 formed therein. The valve bore 3 is provided with a plurality of axially-spaced apart grooves $5_1$ to $5_{10}$ which are formed in turn from the right to the left in the drawing. Reference numeral 4 denotes a cover member for the valve housing 2.

Of the above-mentioned grooves, the second groove $5_2$ communicates with an inlet port 6, and the first and fifth grooves $5_1$ and $5_3$ located on both sides of the second groove $5_2$ communicate through a passage 7 with the tenth groove $5_{10}$, the passage 7 communicating with a load sensing port 8. The fourth and eighth grooves $5_4$ and $5_8$ communicate with cylinder ports 9 and 10, respectively. The fifth and seventh grooves $5_5$ and $5_7$ located between the fourth and eighth grooves $5_4$ and $5_8$ communicate through restrictions $11_1$ and $11_2$, respectively, with the passage 7. The ninth groove $5_9$ communicates through a passage, not shown (refer to reference numeral 12a in FIG. 2) with one part of a fluid measuring unit 12. The sixth groove $5_6$ communicates through a drain port 13 and a check valve 14 with the tenth groove $5_{10}$.

A hollow valve spindle 15 is inserted in the above-mentioned valve bore 3. Further, this valve spool 15 has formed on the outer periphery thereof land portions $16_1$ to $16_4$ adapted to close the above-mentioned second, fourth, eighth and tenth grooves $5_2$, $5_4$, $5_8$, $5_{10}$, respectively, under its neutral condition, first and second notches $17_1$ and $17_2$ adapted to allow the above-mentioned second groove $5_2$ to communicate with the first groove $5_1$ or the third groove $5_3$ when the valve spool 15 is moved from the neutral position to the left or to the right, a bore $17_7$ adapted to allow the fourth groove $5_4$ to communicate with the inside of the valve spool 15 when the latter is moved to the left, notched $17_3$, $17_4$, $17_5$ adapted to allow the seventh groove $5_7$ to communicate with the eighth groove $5_8$ or through the fifth groove $5_5$ and the sixth groove $5_6$ with the fourth groove $5_4$ when the valve spool 15 is moved to the left or to the right, and a notch $17_6$ adapted to be located opposite to the ninth groove $5_9$ under the neutral condition and to allow the ninth groove $5_9$ to communicate with the tenth groove $5_{10}$ or the eighth groove $5_8$ when the spool 15 is moved to the left or to the right.

Further, the outer periphery of the leading end of the above-mentioned valve spool 15 has a piston portion 18 formed integrally thereon and which is adapted to fit in the valve housing 2. First and second annular reaction force chambers $19_1$ and $19_2$ are defined axially on both sides of this piston portion 18.

Out of the above-mentioned reaction force chambers $19_1$ and $19_2$, the axial right-hand reaction force chamber $19_1$ communicates through a passage $20_1$ with the seventh groove $5_7$, whilst the left-hand reaction force chamber $19_2$ communicates through a passage $20_2$ with the fifth groove $5_5$.

The fluid measuring unit 12 consists of gears 21 and 22. These gears 21, 22 are of a rotary or gyratory type, and the arrangement is made such that when the inner gear 21 is rotated relative to the outer gear 22, the fluid which flows therein through one of the two ports is measured by another port and then delivered therefrom. As mentioned above, one of the ports communicates with the ninth groove $5_9$ of the valve housing 2, whilst another port communicates with the inside of the valve spool 15.

The inner gear 21 of the above-mentioned fluid measuring unit 12 is engaged with the leading end of an oscillating shaft 23. The base end of this oscillating shaft 23 is rotatively engaged with the valve spool 15. The base end of this oscillating shaft 23 is connected through a torsion bar 24 with the actuating shaft 1. Further, one end of the valve spool 15 is coupled with the above-mentioned actuating shaft 1 so that the former may be rotated slightly relative to the latter. The arrangement is made such that the valve spool 15 may be axially moved by a ball screw 25 mounted in a spiral groove $25_1$ in response to the rotation of the actuating shaft 1. Accordingly, when the actuating shaft 1 is rotated clockwise (to the right), the valve spool 15 is moved axially from its neutral position, for example, to the left in the drawing. On the contrary, when the actuating shaft 1 is rotated counterclockwise, the valve spool 15 is moved from its neutral position to the right in the drawing. The axial movement of this valve spool 15 allows each of the above-mentioned grooves to communicate selectively with each of the notches and the bores. The aforementioned torsion bar 24 serves as a mechanical thrusting member for thrusting the valve spool 15 always towards the neutral position of the actuating shaft 1.

The inlet port 6 of the above-mentioned housing 2 is connected through a change-over valve 26 with a pump 27. This change-over valve 26 has a communicating position "A" and a draining position "B", and is always biased by a spring 28 to the communicating position "A". This change-over valve 26 has formed on its both sides a first pilot port 29 which acts on the communicating position "A", and a second pilot port 30 which is biased on the side of the draining position "B". The first pilot port 29 is connected with the load sensing port 8 of the above-mentioned housing 2, whilst the second pilot port 30 is connected with the inlet port 6.

Both the passages $20_1$ and $20_2$ which communicate with the aforementioned reaction force chambers $19_1$ and $19_2$, respectively, are connected through a needle valve 31. A needle 32 of the needle valve 31 is adapted to be actuated by a solenoid valve 33. This solenoid valve 33 is adapted to be controlled by a controller 34. The controller 34 is adapted to be actuated in response to input signals from a vehicle speed sensor 35 and a selector switch 36, respectively.

Cylinder ports 9 and 10 of the valve housing 2 are connected with the right and left chambers, respectively, of a steering cylinder 37.

In the next place, the operation of the first embodiment constructed as mentioned hereinabove will be described below.

When the steering wheel SW is held at its neutral posture or position, the valve spool 15 is held at its neutral position as shown in FIG. 1. In this condition, the second groove $5_2$ is shut off by the valve spool 15, so that the fluid under pressure supplied through the change-over valve 26 by the pump 27 runs dead-end in the inlet port 6, and the pressure prevailing at that time is applied to the second pilot port 30 of the change-over valve 26 thereby changing this change-over valve 26 over to its draining position "B" so as to drain the fluid under pressure from the above-mentioned pump 27.

When the steering wheel SW is rotated, for example, to the right (clockwise), the actuating shaft 1 connected to the steering wheel SW is rotated rightward to allow the valve spool 15 to be moved by the ball screw 25 to the left in the drawing. This leftward movement permits communication between the first and second grooves $5_1$ and $5_2$ so that the fluid under pressure from the pump 27 may enter the inlet port 6 and pass from the second groove $5_2$ through the first groove $5_1$ and passage 7 and then through the load sensing port 8 and act on the first pilot port 29 of the change-over valve 26, thereby changing this change-over valve 26 over to its communicating position "A" to enable the fluid under pressure to be supplied into the inlet port 6 at a flow rate corresponding to the angle of rotation of the steering wheel SW.

The fluid under pressure supplied into the inlet port 6 is passed through the passage 7 into the tenth groove $5_{10}$, and then through the nineth groove $5_9$ into the fluid measuring unit 12. This fluid measuring unit 12 is driven by the rotation of the above-mentioned actuating shaft 1 through the torsion member 24 and the oscillating shaft 23. The fluid under pressure from the fluid measuring unit 12 is supplied, at a flow rate corresponding to the angle of rotation of the above-mentioned actuating shaft 1, through the inside of the valve spool 15, the bore $17_7$ and the fourth groove $5_4$ into the right hand chamber of the steering cylinder 37 thus actuating this steering cylinder 37 for the rightward steering. The returning fluid at that time is drained through the eighth, seventh and sixth grooves $5_8$, $5_7$ and $5_6$.

When the steering wheel SW is rotated to the left (counterclockwise), in the reverse manner to the above-mentioned operation, the valve spool 15 is moved to the right to enable the third groove $5_3$ to communicate through the bore $17_7$ with the inside of the valve spool 15 so that the fluid under pressure from the inlet port 6 may flow through this bore $17_7$ and the inside of the valve spool 15 into the fluid measuring unit 12, and then the fluid under pressure from the fluid measuring unit 12 may flow, at a flow rate corresponding to the angle of rotation of the above-mentioned steering wheel SW, through the ninth and eighth grooves $5_9$ and $5_8$ into the left-hand chamber of the steering cylinder 37, thereby actuating the steering cylinder 37 for the leftward steering. The returning fluid at that time is drained through the fourth, fifth and sixth grooves $5_4$, $5_5$ and $5_6$.

At that time, the first and second reaction force chambers $19_1$ and $19_2$ defined between the piston portion 18 of the valve spool 15 and the housing 2 are supplied with the fluid under pressure from the inlet port 6 which is passed through the first and third grooves $5_1$ and $5_3$, the restrictions $11_1$ and $11_2$, and the passages $20_1$ and $20_2$, respectively.

In the steering operation wherein the steering cylinder 37 is actuated by the rotation of the above-mentioned actuating shaft 1, when the fluid under pressure is allowed to pass through the fluid measuring unit 12, the gear 21 is rotated in the same direction as the actuating shaft 1 thus allowing the valve spool 15 to be rotated by the oscillating shaft 23 to its neutral position relative to the actuating shaft 1.

When the vehicle speed is increased and is detected by the vehicle speed sensor 35 and transmitted as an input signal to the controller 34, the latter will transmit an output signal corresponding to the vehicle speed at that time to the solenoid valve 33. This solenoid valve 33 is actuated to close the needle valve 31 as the vehicle speed is increased, and the degree of opening of the needle valve 31 varies with the vehicle speed.

Therefore, since the needle valve 31 is opened when the vehicle speed is low, and the fluid in both the reaction force chambers $19_1$ and $19_2$ are drained through this needle valve 31, the pressures $P_1$ and $P_2$ prevailing in the reaction force chambers $19_1$ and $19_2$ will not offer resistance to the movements of the valve spool 15 to the left and to the right. The force required for moving the valve spool 15; that is to say, the steering force required at that time is only the force for twisting the torsion bar 24.

When the vehicle speed is increased and an output signal is transmitted by the above-mentioned controller 34 to the solenoid valve 33, the needle valve 31 is rendered operative so that the passages $20_1$ and $20_2$ are restricted slowly by the needle valve 31. In the case where the steering wheel SW is rotated to the right (clockwise) i.e., in the case of rightward steering, the valve spool 15 is moved to the left so that the fluid pressure $P_1$ introduced from the fifth groove $5_5$ through the restriction $11_1$ may be applied to the second reaction force chamber $19_2$, whilst the fluid pressure $P_2$ introduced from the seventh groove $5_7$ through the restriction $11_2$ may be applied to the first reaction force chamber $19_1$. Further, the seventh groove $5_7$ is allowed to communicate with the drain port 13, and so it is subjected to the pressure of the fluid returning to the steering cylinder 37. The fifth groove $5_5$ is not allowed then to communicate with the drain port 13, and as a result, the reaction force exerted in the fifth groove $5_5$ and the second reaction force chamber $19_2$ are confined therein. Therefore, the pressure in the second reaction force chamber $19_2$ is equal to the pressure in the load sensing port 8, and is approximately equal to the pressure working in the steering cylinder 37. Therefore, the relationship between the pressures $P_1$ and $P_2$ in the first and second reaction force chambers becomes $P_1 > P_2$ and the valve spool 15 tends to move to the right; however, in order to continue the rightward steering, the valve spool has to be pushed to the left against this reaction force, and therefore the force for rotating the actuating shaft 1 will increase. The above-mentioned relationship $P_1 > P_2$ will enhance with the increase in the vehicle speed, and therefore the force required for rotating the steering wheel will increase with the increase in the vehicle speed.

When the valve spool 15 is moved to the right by the leftward steering, the relationship $P_2 > P_1$ is obtained and the remaining operation is the same as that in case of the rightward steering, and therefore the explanation thereof is omitted to avoid duplication.

Figure 2:
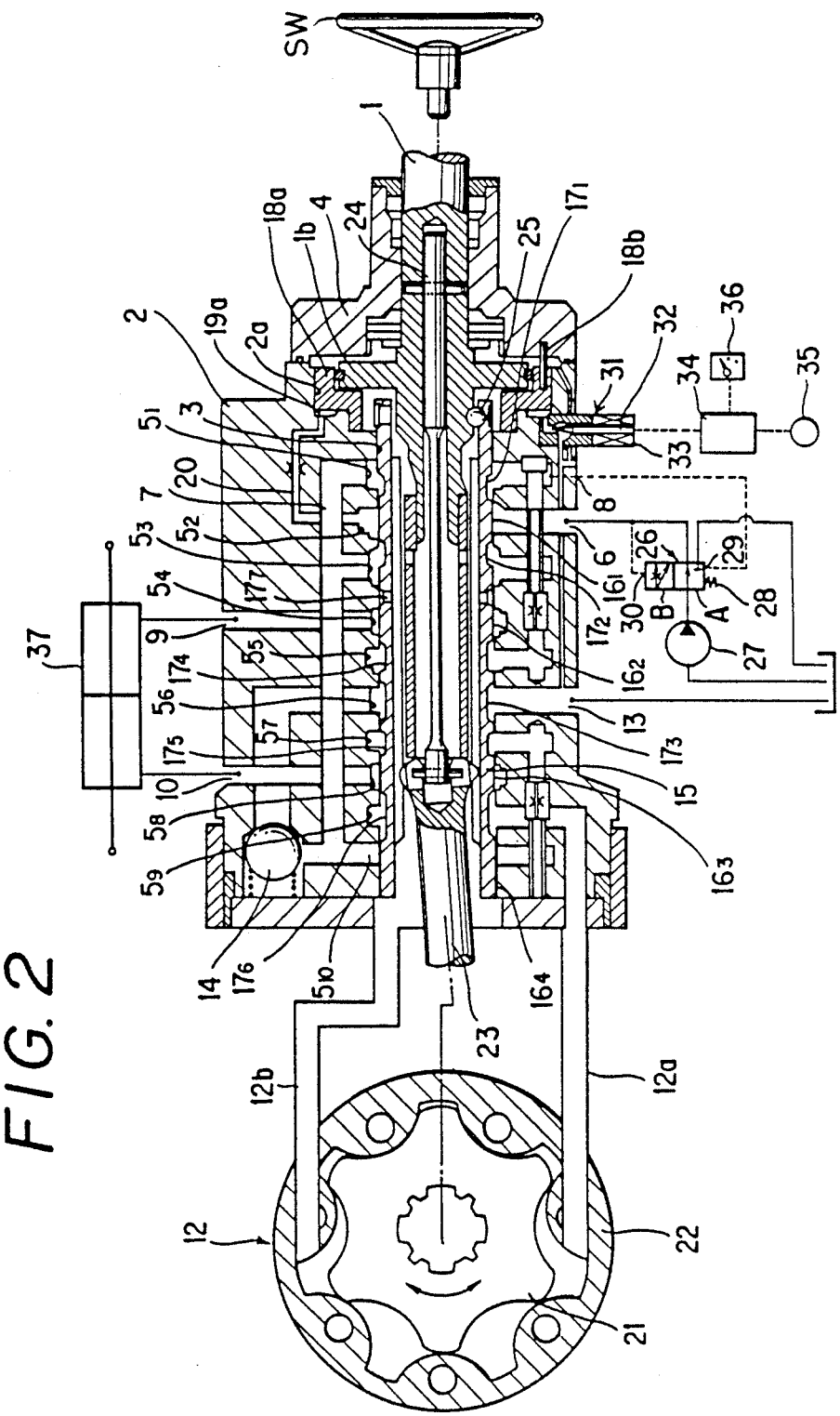
FIG. 2 is a schematic, partially sectioned explanatory view showing another embodiment of a steering system according to the present invention.

The second embodiment of the present invention is shown in FIG. 2. In this second embodiment, there is clearly shown the condition in which the ninth groove $5_9$ out of the plurality of the grooves $5_1$ to $5_{10}$ formed in the valve bore 3 is allowed to communicate through the passage 12a with one port of the fluid measuring unit 12. In the first embodiment already explained too, it is needless to say that the same condition is shown.

The second embodiment as shown in FIG. 2 has many component parts identical and similar to those of the first embodiment which has been described with reference to FIG. 1. These identical and similar component parts shown in FIG. 2 are denoted with the same reference numerals and characters which are used to indicate the corresponding component parts of the first embodiment, and have the same functions with regard to the steering gear for achieving the object of the present invention. Therefore, the explanation of the identical and similar component parts is omitted to avoid duplication and useless, lengthy explanation.

Only the points of difference of the second embodiment from the first embodiment will be explained below.

Stating in brief, with reference to the control of the actuating force applied by the actuating shaft 1, at the inside position adjacent to the cover member 4 of the valve housing 2 there is provided a flange 1b projecting from a part of the outer periphery of the actuating shaft 1 along the outer periphery. Annular piston 18a is axially movably mounted between the outer peripheral surface of the flange 1b and the inner peripheral surface of the annular cylinder 2a recessed in the valve housing 2 in such a relationship that the piston is kept in sliding contact with both the outer and inner peripheral surfaces and abuts against one side surface of the above-mentioned flange 16. Further, to prevent the rotation of the piston 18a itself, the latter is axially movably engaged with a piece of projecting pin 18b fixedly secured to the inner side surface of the cover member 4. Inside the cylinder 2a there is formed a pressure chamber 19a to bias the piston 18a towards the flange 1b. The arrangement is made such that this pressure chamber 19a is connected through a passage 20 with the inlet port 6 to allow the fluid under pressure from the pump 27 to be supplied therein, whilst the passage 20 is allowed to communicate through the needle valve 31 with the drain port 13.

The control of the actuating force applied by the actuating shaft 1 in the second embodiment will be made by the following action.

Stated in brief, when the fluid under pressure is supplied through the passage 20 into the pressure chamber 19a, the piston 18a is pushed against the inside surface of the flange 1b of the actuating shaft 1, and the frictional contact force exerted between the piston and the flange 1b may apply a braking force onto the actuating shaft 1.

When the vehicle speed is increased and this vehicle speed is detected by the sensor 35, a signal generated by the sensor 35 is transmitted to the controller 34 as its input. Subsequently, the controller 34 will transmit an output signal corresponding to the speed of the vehicle at that time to the solenoid valve 33. Then, the solenoid valve 33 will actuate the needle valve 31 so as to restrict the degree of opening thereof in proportion to the increase in the vehicle speed. In other words, the arrangement is made such that the degree of opening of the needle valve 31 may be varied with the increase in the vehicle speed.

Accordingly, when the vehicle speed is low, the degree of opening of the needle valve 31 is increased, with the result that the fluid under pressure in the pressure chamber 19a is drained into the drain port 13 without being subjected to restriction or throttling action. As a result, the piston 18a will not apply the braking force onto the actuating shaft 1, and therefore the force required for moving the valve spool 15; that is to say, the steering force required at that time will be only the force for twisting the torsion bar 24.

When the vehicle speed is increased so as to close the needle valve gradually, the fluid pressure within the pressure chamber 19a is increased so that the braking force applied by the above-mentioned piston 18a on the actuating shaft 1 may be increased gradually. In brief, the force for operating the steering wheel SW, i.e., the steering force will increase with the increase in the speed of the vehicle.

Further, in any of the above-mentnioned embodiments, the signal transmitted by the controller 34 is varied by the signal transmitted by the vehicle speed sensor 35. The magnitude or the timing of transmission of the signal from the controller 34 can be adjusted by means of the selector switch 36, and the operating force of the steering wheel and the change thereof can be adjusted according to the preference of the operator.

I claim:

1. A steering system of a fully hydraulically-operated type constructed such that a fluid under pressue is supplied, at a flow rate corresponding to the amount of rotational movement of an actuating shaft adapted to be rotatively driven by turning a steering wheel, through a port whose area of opening is controlled by the amount of rotational movement of the actuating shaft adapted to be rotatively driven by the turning of the steering wheel, and then through a fluid measuring unit into a steering cylinder so that a steering operation corresponding to the amount of rotation of the steering wheel is caused by the action of the fluid pressure force and the amount of pressurized fluid supplied into the steering cylinder, characterized as comprising an apparatus for regulating actuating force applied by an actuating shaft by the action of the fluid pressure force to be controlled in accordance with the running speed of the vehicle; and further characterized in that said apparatus for regulating the actuating force applied by said actuating shaft includes a valve spool slidably inserted in a valve bore formed in a valve housing so that it may be axially moved in accordance with the amount of rotational movement of the actuating shaft; a piston portion projecting as an integral unit of a part of the outer periphery of the valve spool and along the outer periphery and which is kept in sliding contact with the inner peripheral surface of the valve housing formed in a part of the valve bore and along the inner periphery; two annular reaction force chambers formed axially on both sides of the piston portion; and a pressure control means interposed between the annular reaction force chambers and a pressurized fluid supply source and adapted to control the fluid pressure forces within the two reaction force chambers in accordnce with the running speed of the vehicle.

2. The steering system as set forth in claim 1, characterized in that said pressure control means includes a needle valve having a needle actuated by a solenoid valve; a controller connected with the solenoid valve so as to control the actuation of said solenoid valve in accordance with the vehicle speed; and a vehicle speed sensor and a selector switch each being adapted to transmit a signal to the controller.

3. The steering system as set forth in claim 1, characterized in that the apparatus for regulating the actuating force applied by the actuating shaft includes a valve spool slidably inserted in the valve bore formed in the valve housing so that the spool may be axially moved in accordance with the amount of rotational movement of the actuating shaft; a flange projecting integrally from a part of the outer periphery of said actuating shaft and along the outer periphery; an annular piston disposed so as to be moved axially and in such a relationship as it is kept in sliding contact with both the outer peripheral surface of the flange and the inner peripheral surface of the annular cylinder recessed in the valve housing, respectively, between the outer peripheral surface and the inner peripheral surface andf it also abuts against one side surface of the flange; a pressure chamber connected with a pressurized fluid supply source so as to bias the piston towards said flange; and a pressure control means interposed between the pressure chamber and the pressurized fluid supply source and adapted to control the fluid pressure force within the pressure chamber in accordance with the running speed of the vehicle.

4. The steering system as set forth in claim 3, characterized in that said pressure control means includes a needle valve having a needle actuated by a solenoid valve; a controller connected with the solenoid valve so as to control the actuation of said solenoid valve in accordance with the vehicle speed; and a vehicle speed sensor and a selector switch each being adapted to transmit a signal to the controller.

* * * * *